United States Patent
Beldam et al.

(10) Patent No.: US 6,634,419 B1
(45) Date of Patent: Oct. 21, 2003

(54) MULTI-PASS EXHAUST GAS RECIRCULATION COOLER

(75) Inventors: Richard Paul Beldam, Torrance, CA (US); Keith D. Agee, Torrance, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/161,249

(22) Filed: May 31, 2002

(51) Int. Cl.[7] ................................................ F28F 13/00
(52) U.S. Cl. ...................................... 165/146; 165/166
(58) Field of Search ................................ 165/165, 166, 165/167, 146, 170

(56) References Cited

U.S. PATENT DOCUMENTS

| | | | | |
|---|---|---|---|---|
| 6,032,730 A | * | 3/2000 | Akita et al. | 165/166 |
| 6,059,025 A | * | 5/2000 | Hossfeld | 165/166 |

FOREIGN PATENT DOCUMENTS

JP          59-229183 A   * 12/1984   ............... 165/166

* cited by examiner

Primary Examiner—Terrell McKinnon
(74) Attorney, Agent, or Firm—Ephraim Starr; Rod Baker

(57) ABSTRACT

An apparatus and method for cooling hot fluids, especially exhaust gases, with a multi-pass cooler core. The cooler core is particularly useful for cooling exhaust gases flowing in an exhaust gas recirculation (EGR) system or regime in operative association with an internal combustion engine, such as a diesel engine. Cooled gases are recirculated to the engine input to help reduce noxious exhaust emissions. The invention utilizes unequal areas-in-flow between the first exhaust pass through the core and the second and subsequent passes through the core. The first pass through the core features an area-in-flow comparatively larger than the area-in-flow of the second pass. The difference in areas-in-flow between passes influences gas velocities to reduce fouling, despite changes in exhaust gas temperature between passes through the core.

10 Claims, 2 Drawing Sheets

MULTI-PASS EXHAUST GAS RECIRCULATION COOLER

BACKGROUND OF THE INVENTION

1. Field of the Invention

The present invention relates generally to apparatuses for cooling exhaust gases, particularly exhausts from internal combustion engines, and specifically relates to a multi-pass recirculation cooler.

2. Background Art

It is known in the general art of internal combustion engines to provide some system of turbocharging, whereby a turbine harnesses energy from exhaust gases to power a compressor. The compressor is then used to increase engine performance, typically by boosting the pressure of air supplied to the engine.

Nearly as important as engine performance is the need for cleaner exhausts. Most internal combustion engines in the United States are subject to regulations from the U.S. Environmental Protection Agency governing pollutant levels in engine emissions. "Stationary sources" such as internal combustion engine powered generators and the like, as well as motor vehicles, are required to maintain emissions of certain pollutants, such as CO and $NO_x$, below legal limits. Pollution control, however, ideally is accomplished while compromising engine performance as little as possible.

One mode of reducing the emissions of internal combustion engines—regardless of whether the engine is turbocharged, but frequently when it is—is through exhaust gas recirculation (EGR). EGR involves the return to the engine's intake manifold of some portion of the engine exhaust. Exhaust gases are diverted from the exhaust manifold through a duct or conduit for delivery to the intake manifold, thereby allowing exhaust to be introduced to the combustion cycle, so that oxygen content is reduced, which in turn reduces the high combustion temperature that contributes to excessive $NO_x$ formation.

The EGR method of reducing exhaust emissions has drawbacks. A specific problem is that EGR is most effective when the gases are cooled, which problem can be solved in part by using heat exchangers. It is known to provide "multi-pass" coolers in conjunction with EGR systems, whereby the heated exhaust passes two or more times through the heat exchanger core. Exhaust gas enters an EGR cooler at very high temperature and exits at much lower temperature, resulting in a large change in gas density as it transits the cooler. Consequently, the exhaust gas has a high velocity in the first pass, but much lower velocities in the second and any subsequent passes through the core. The high gas velocity causes high parasitic pressure losses in the first pass, and the reduced velocity in the subsequent passes results in low heat transfer. Gas side fouling of the system is inversely related to gas velocity, so the low gas velocity in the second and subsequent passes through the core increases the potential for deleterious fouling.

Against the foregoing background, the present invention was developed. The scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate two embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (Best Modes for Carrying out the Invention)

The present invention relates to an improved apparatus for cooling the exhaust gases flowing through an exhaust gas recirculation (EGR) system. The invention will find ready and valuable application in any context where heated exhaust is to be cooled, but is particularly useful in EGR systems installed on internal combustion engines, where exhaust is diverted and returned to the input of the power system. The apparatus of the invention may find beneficial use in connection with EGR systems used with diesel-fueled power plants, including but not limited to the engines of large motor vehicles.

The present invention, as further characterized and disclosed hereafter, ameliorates or eliminates certain problems associated with current methods for cooling recirculated exhaust in known EGR systems. Many EGR systems employ heat exchangers to cool exhaust gases before recirculating them to the engine's input manifold. The heat exchangers incorporated into EGR systems function according to generally conventional principles of heat transfer. The hot exhaust gases are directed through an array of tubes or conduits fashioned from materials having relatively high thermal conductivity. These hot gas conduits are placed in intimate adjacency with coolant conduits. For example, the exterior surfaces of the hot gas conduits may be in direct contact with the exteriors of the coolant conduits, or the hot gas conduits may be enveloped or surrounded by the coolant conduits so as to immerse the hot gas conduits in the flowing coolant itself, or heat transfer fins may extend from the hot gas conduits to or into the coolant conduits, or the like. Heat energy is absorbed from the exhaust by the gas conduits, and then transferred by conduction to the coolant conduits, where the excess heat energy is transferred away by convection. Very preferably, and in most applications necessarily, the hot gas never comes in direct contact with the flowing coolant, the two at all times being separated by at least the walls of the hot gas conduits. The foregoing functions of heat exchangers are well-known, and need no further elaboration to one skilled in the art.

Figure 1:
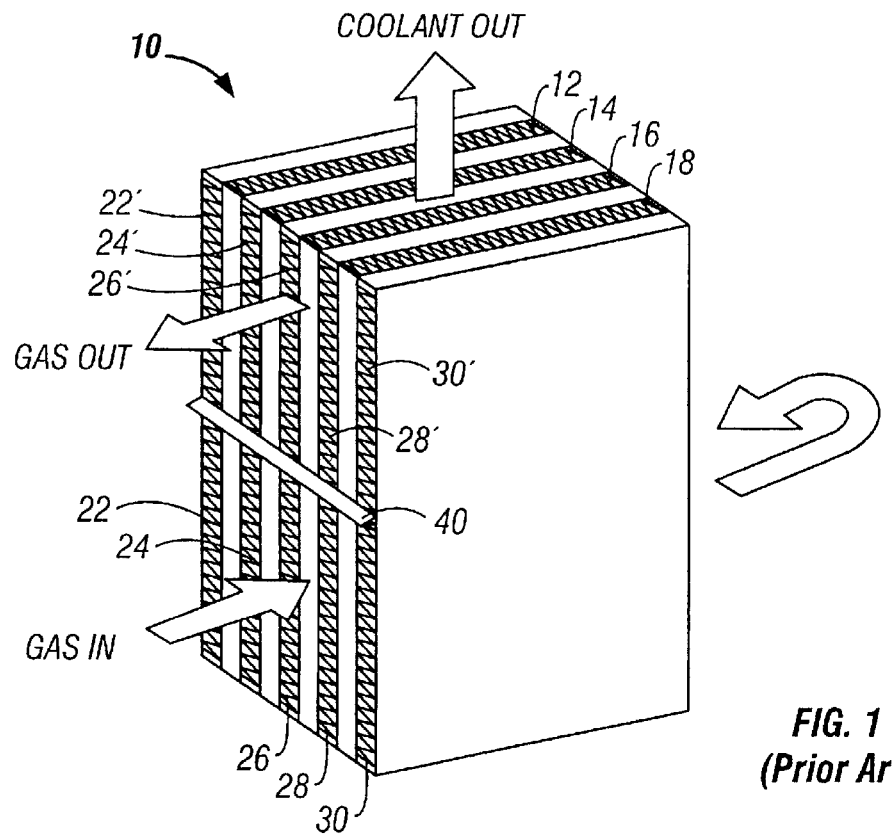
FIG. 1 is a perspective, diagrammatic, bi-sectional view of an exhaust gas recirculation cooler from the prior art, showing a typical "equal passage" or "equal area" configuration.

The present invention is placed in proper context by referring to FIG. 1, showing a heat exchanger or cooler known in the art. For clarity of illustration, FIG. 1 shows a prior art cooler in both vertical and horizontal section, to reveal the interior components of the device. Further, all intake and outlet manifolds are omitted from the drawing for the sake of clarity. Again, the construction, configuration and operation of the cooler of FIG. 1 is within the knowledge of one skilled in the art, including the provision of appropriate manifolds. Referring to FIG. 1, it is seen that a typical cooler core 10 is assembled from a collection of contiguous, parallel, walled plenums. Coolant plenums 12, 14, 16, 18 are sandwiched between exhaust plenums 22, 24, 26, 28, 30 in an alternating manner. Walled coolant plenums 12, 14, 16, 18 contain and convey the flowing coolant (e.g. water, or an aqueous mixture of ethylene glycol or the like). As seen in the figure, the coolant plenums 12, 14, 16, 18 as well as the exhaust plenums 22, 24, 26, 28, 30 preferably feature extended surfaces or fins (such as those defined by a single zigzag pleated or corrugated sheet disposed between the confronting walls) extending between their respective opposing walls, to define axial flow passages therein. Many variations of fins or extended variations are possible, including many presently known in the art, for promoting heat transfer, and it is not intended to restrict the present invention to any particular configuration for defining axial flow passages.

In FIG. 1, the coolant is directed to flow from the bottom of the core 10 to the top, via the coolant passages in the coolant plenums 12, 14, 16, 18, as suggested by the large directional arrow of the figure. (It is immediately understood that the coolant flow as readily could be from the top toward the bottom of the core 10, and that the fluid circuit as well could be multi-pass.)

The prior art core 10 shown in FIG. 1 is of the "two pass" variety," that is, the hot exhaust is passed between the coolant plenums 12, 14, 16, 18 twice before being returned to the engine intake manifold. "Multiple pass" cores, involving three or more passes of the exhaust gas through the core are known, but seldom encountered. Exhaust gas is directed to flow through the exhaust plenums 22, 24, 26, 28, 30 via the hot gas passages therein. As indicated by the large directional arrows in the figure, the hot exhaust flows through the core 10 in directions perpendicular to the direction of coolant flow, i.e., the hot gas passages axes are disposed at ninety-degree angles relative to the coolant passages, despite that the hot gases and coolant are flowing in parallel plenums. (Other known configurations provide for coolant flow and hot gas flow in parallel, rather than perpendicular, directions; the unequal area concept of the present invention could be extended and applied in these alternative configurations.)

Further, and again as indicated by the large directional arrows in FIG. 1, the hot exhaust flows in opposing directions during separate passes through the core 10. Hot gas flows from left to right (as viewed in FIG. 1) during the first pass through the core 10, and subsequently from right to left during the second pass. There is provided some conventional means (e.g., ordinary U-fittings joining the ends of adjacent passages, not shown) for reversing the hot gas direction of flow between passes through the core 10.

A sealing divider 40 (or dividers) is provided between opposing pairs of exhaust plenum walls to separate the first-pass exhaust flow from the second-pass flow (without interfering with the coolant flow through coolant plenums 12, 14, 16, 18). It will be understood that the divider 40 could as well have been oriented vertically in the core 10 of FIG. 1, in which instance the hot gas flow would first be downward, then reversed to be upward on the second pass, or visa-versa. Thus, the divider 40 separates the exhaust plenums into associated first-pass exhaust plenums 22, 24, 26, 28, and 30, and subsequent-pass exhaust plenums 22', 24', 26', 28', 30'.

As suggested in FIG. 1, conventional EGR coolers have a uniform number of hot gas passages for each pass through the core 10. More generally described, the cross-sectional areas of the exhaust plenums 22, 24, 26, 28, 30 (measured in a plane normal to the direction of gas flow) remains constant for all passes of the gas through the core 10. Thus, the areas-in-flow for the first-pass plenums 22, 24, 26, 28, 30, and for the subsequent-pass exhaust plenums 22', 24', 26', 28', 30'is about equal. Consequently, in known devices the exhaust gas's area-in-flow is consistent throughout the core. By way of further explication, the area-in-flow approximately equals the sum of the radial cross sectional areas of all the passages through which the gas flows. The area-in-flow in a single plenum 22 without any discrete passages defined therein is simply the product of the interior dimensions of height and width of the plenum (the axial or length dimension being measured in the direction of fluid flow).

Because the area-in-flow remains constant for all hot exhaust gas passes through the core, if the density of the gas also remains constant, its velocity will remain essentially unchanged (assuming negligible flow friction losses in the system). The foregoing is known in the art of fluid dynamics, and is apparent from the continuity equation for volume discharge of a fluid:

$$Q = VA \qquad (1)$$

where Q is the discharge (volume of flow per unit time), and V is the average velocity of the fluid through a cross sectional area A (the area-in-flow). Importantly, if the density of the gas changes between two points along the flow path, the change in density must be accounted for by employing the continuity equation for mass flow:

$$G = \rho_1 A_1 V_1 = \rho_2 A_2 V_2 \qquad (2)$$

where G is the mass flow, $\rho_1$ is the fluid density (mass per unit volume) at a first location, $A_1$ is the area-in-flow at the first location, $V_1$ is the average fluid velocity through the cross section $A_1$, $\rho_2$ is the fluid density at a second location, $A_2$ is the area-in-flow at the second location, and $V_2$ is the average fluid velocity through cross section $A_2$.

Application of equation (1) shows that when the area-in-flow is held constant between the two locations along the flowstream, changes in density are accompanied by inverse changes in velocity; if the density increases, the velocity decreases, and visa-versa. This has important consequences in the field of EGR cooling.

Gas enters an EGR cooler a t very high temperature and exists at a much cooler temperature, as a desired result of the heat exchange. Cooling of the gas, however, results in a large change in the gas density as it passes through the cooler —the lower the gas temperature, the greater its density. The result, in prior art coolers, is a comparatively high gas velocity in the first pass, and much lower velocity in subsequent passes, as the area in flow is unchanging between passes. The high velocity in the first pass causes parasitic pressure losses, and the lower velocity in the subsequent passes through the cooler core 10 results in reduced heat transfer. Gas side fouling is inversely related to gas velocity, so that the low gas velocity in the second (and any additional) passes increases the potential for undesirable system fouling.

The present invention addresses and ameliorates the aforementioned problem by changing the area-in-flow corresponding to each pass through the core to accommodate changes in the exhaust gas density. Using a relatively larger number of passages (i.e., enlarged area-in-flow $A_1$ in equation (2)) in the first gas passage, and a lesser number of passages (relatively smaller area-in-flow $A_2$) on a second or subsequent passes, results in comparatively lower average gas velocity ($V_1$) in the first pass (thus reducing pressure drop in that pass). The reduced area-in-flow ($A_2$) in subsequent passes increases the fluid average velocity ($V_2$) in those passes compared to what it would be in a conventional equal are design, thus increasing the heat transfer in the subsequent passes with a relatively small effect on pressure drop in those passes. A secondary but significant benefit is that surface temperatures in the first pass are reduced, thus reducing potential for coolant boiling and thermal cycle fatigue. The increased gas velocity in subsequent passes also reduces the potential for fouling.

Figure 2:
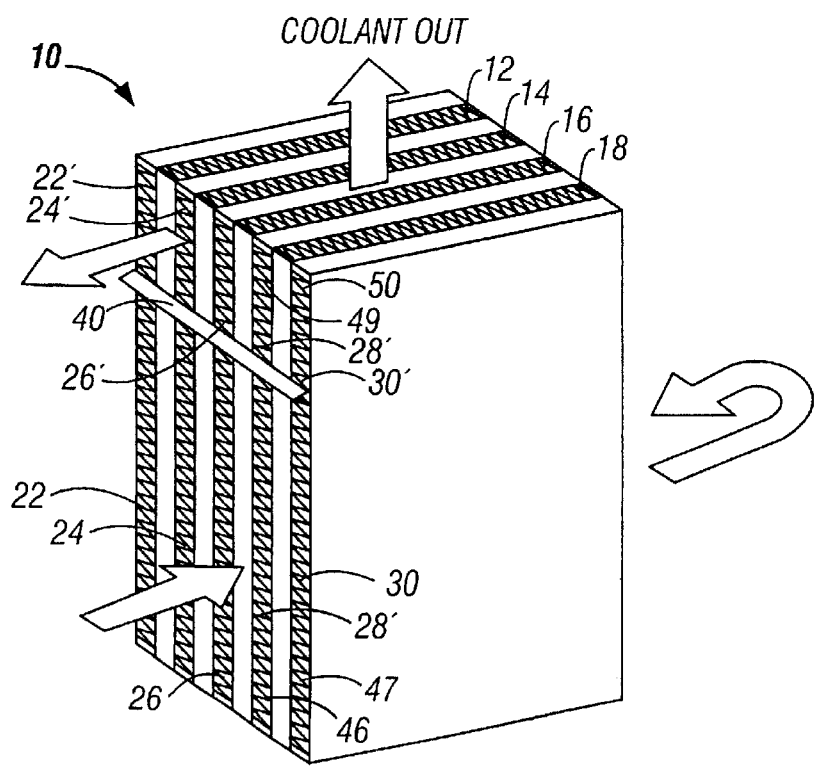
FIG. 2 is a perspective, diagrammatic, bi-sectional view of an exhaust gas recirculation cooler according to the present invention, showing unequal gas passage areas.
Figure 3:
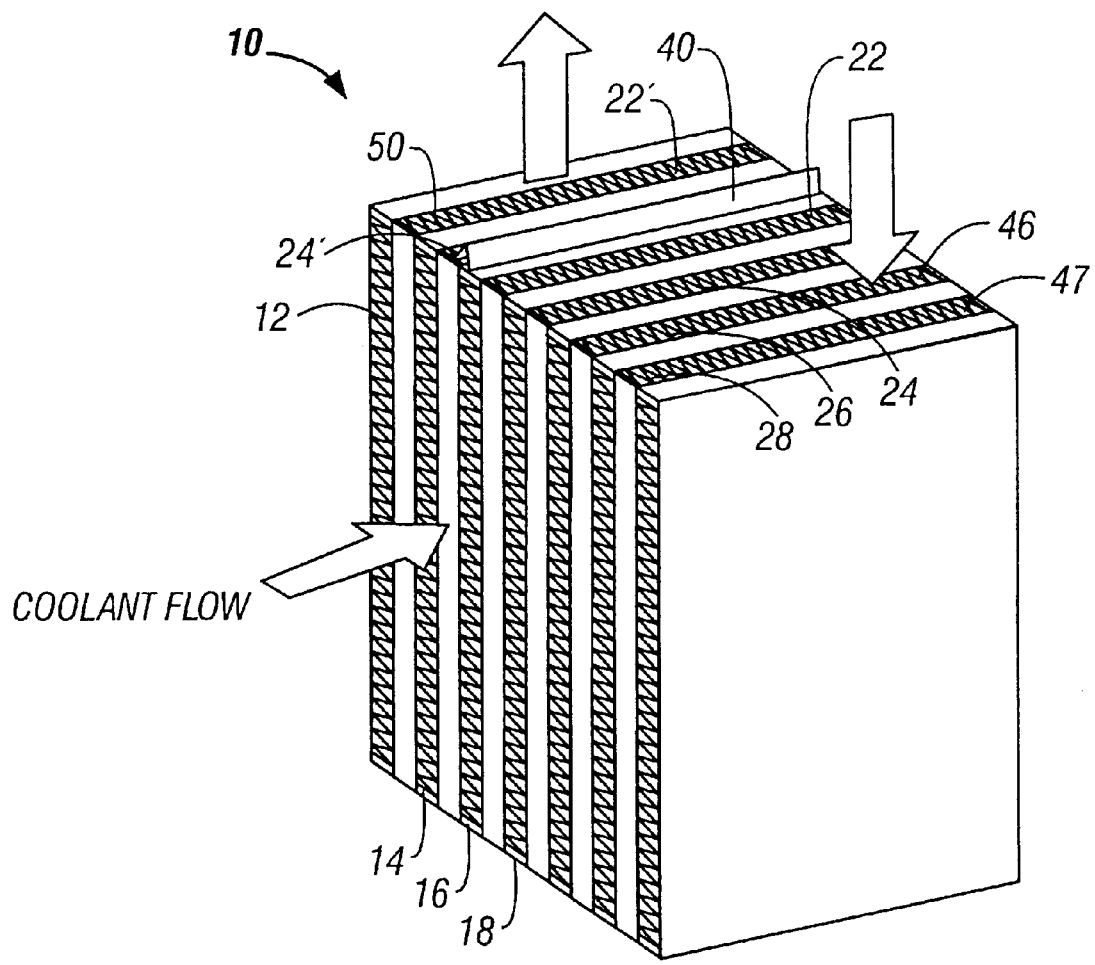
FIG. 3 is a perspective, diagrammatic, bi-sectional view of an alternative embodiment of an "unequal passage" exhaust gas recirculation cooler according to the invention, showing a "folded flow" configuration.

FIGS. 2 and 3 depict the fundamentals of the apparatus of the invention. The cooler core 10 of FIG. 2 employs an elongated, generally planar divider 40 to separate the hot gas flow in the first-pass exhaust plenums 22, 24, 26, 28, and 30 from the hot gas flow in the subsequent-pass exhaust plenums 22', 24', 26', 28', 30'. Referring to FIG. 2, it is seen that an imaginary plane containing the divider 40 is generally perpendicular to all the plenums, particularly to the coolant plenums 12, 14, 16, 18, but without obstructing coolant flow. Such an arrangement is characterized as a "crossflow" configuration. In the embodiment of FIG. 3, where an imaginary plane containing the divider 40 is generally parallel to the plenums, including the coolant plenums 12, 14, 16, 18, the exhaust gas is directed in a "folded flow" pattern. The folded flow configuration may be preferred for its simpler construction (without interfering with coolant flow), and because the divider 40 can sit against a solid bar or plenum wall and have a better seal against bypass leakage. Otherwise, the embodiments of FIGS. 2 and 3 are generally the same in form and function.

Combined reference is made to FIGS. 2 and 3. The inventive apparatus thus provides a multi-pass heat exchanger core 10. The core 10 has at least one coolant plenum 12 for containing flowing coolant, but preferably features a plurality of coolant plenums 12, 14, 16, 18 of any practical desired number. The inventive core 10 also has at least one first-pass exhaust plenum 22, and preferably a plurality of first-pass exhaust plenums 22, 24, 26, 28, 30, for containing flowing heated fluid, such as the exhaust of an internal combustion engine. As seen in both FIGS. 2 and 3, each first-pass exhaust plenum 22, 24, 26, 28, or 30 is adjacent to at least one of the coolant plenums 12, 14, 16, 18. The first-pass exhaust plenum 22 (if single) or the several of them 22, 24, 26, 28, or 30 (if a plurality) defines a first area-in-flow of heated fluid. Stated differently, if a lone first-pass exhaust plenum 22 is employed, the area-in-flow is defined by the dimensions of the one plenum 22; if, as is preferred, a plurality of first-pass plenums are employed, the first area-in-flow is derived from a sum of the plurality's areas-in-flow.

The inventive core 10 also has at least one subsequent-pass exhaust plenum 22' (and preferably a plurality of subsequent-pass exhaust plenums 22', 24', 26', 28', 30') for containing heated fluid. Each of the subsequent-pass plenums 22', 24', 26', 28', or 30' is adjacent to at least one of the coolant plenums 12, 14, 16, 18. The subsequent-pass exhaust plenum 22' (if single) or the several of them 22', 24', 26', 28', or 30' (if a plurality) defines a second area-inflow of heated fluid. Importantly, the first area-in-flow (defined by the first-pass exhaust plenum(s)) substantially exceeds the second area-in-flow (defined by the subsequent-pass exhaust plenum(s)).

As mentioned, preferred embodiments of the core 10 use a plurality of coolant plenums 12, 14, 16, 18, a plurality of first-pass exhaust plenums 22, 24, 26, 28, 30, and a plurality of subsequent-pass exhaust plenums 22', 24', 26', 28', 30'. In such instances, the first-pass 22, 24, 26, 28, 30 and subsequent-pass 22', 24', 26', 28', 30' exhaust plenums preferably are arranged in an alternating manner between cooling plenums, every second plenum being a cooling plenum 12, 14, 16, or 18, as seen in FIGS. 2 and 3.

The heated fluid in the exhaust plenums may be internal combustion exhaust, which may be dominated by a single gas, or more commonly is a mixture of by-product gases including nitrogen oxides, carbon monoxides, carbon dioxides, and the like. When exhaust gases are being recirculated in an EGR system, the associated inventive cooler core 10 preferably has a first plurality of exhaust passages 46, 47 defined in each of the first-pass plenums 22, 24, 26, 28, 30 to direct exhaust gases though the first-pass plenums. Similarly, a second plurality of exhaust passages 49, 50 are defined in each of the subsequent-pass exhaust plenums 22', 24', 26', 28', 30' to direct exhaust gases though the subsequent-pass plenums.

The total number of exhaust passages 46, 47 in the collection of first-pass plenums substantially exceeds the total number of exhaust passages in the subsequent-pass plenums, so that the total area-in-flow in the first pass through the core 10 substantially exceeds the total area-in-flow in the second pass through the core, as seen in FIGS. 2 and 3. The ratio of first area-in-flow to the second area-in-flow therefore is greater than 1:1, preferably between about 1.3:1 and about 1.7:1. Thus when, as is preferred, all the exhaust passages have equal radial cross sectional areas. When the exhaust passages 46, 47, 49, 50 have generally equal cross sectional areas, the ratio of exhaust passages 46, 47 defined in the first-pass plenums 22, 24, 26, 28, 30 to the exhaust passages 49, 50 defined in the subsequent-pass plenums 22', 24', 26', 28', 30' preferably is greater than 1:1, and preferably from about 1.3:1 (one point three to one) to about 1.7:1 (one point seven to one), inclusive, and most preferably about 1.4:1 (one point four-to-one). At ratios be low 1.3:1, the beneficial effects fall off dramatically, and at ratios higher than 1.7:1, performance declines. There ratios, however, are by way of example, and may be customized for a given core 10 to accommodate the gases, temperatures, and changes in gas density involved in the particular application.

As suggested i n the drawing figures, the exhaust passages 46, 47 and 49, 50 preferably are defined by thin fins within the first-pass 22, 24, 26, 28, 30 and the subsequent-pass plenums 22', 24', 26', 28', 30'. The fins conduct heat energy toward the cooling 12, 14, 16, or 18, in a manner similar to conventional radiators and exchangers.

Referring specifically to FIG. 2, the cross-flow core 10 mounts at least one elongate divider 40 to separate the exhaust flow in the first-pass plenums 22, 24, 26, 28, 30 from the exhaust flow in the subsequent-pass plenums 22', 24', 26', 28', 30'; all the plenums preferably are substantially parallel, and an imaginary plane containing the divider 40 is perpendicular to the plenums to direct the exhaust in a crossflow.

In the embodiment of FIG. 3, the core 10 mounts at least one elongate divider 40 to separate the exhaust flow in the first-pass plenums 22, 24, 26, 28, 30 from the exhaust flow in the subsequent-pass plenums 22', 24', 26', 28', 30'. Again, all the plenums are substantially parallel, but an imaginary plane containing the divider 40 is parallel to the plenums to direct the exhaust in a folded flow.

It is seen that in a crossflow embodiment, such as seen in FIG. 2, the number of first-pass exhaust plenums 22, 24, 26, 28, 30 equals the number of subsequent-pass plenums 22', 24', 26', 28', 30'; the difference in respective areas-in-flow between the passes is realized by providing the subsequent-pass plenums 22', 24', 26', 28', 30' with smaller effective dimension (e.g. height in FIG. 2). In the folded-flow embodiment of FIG. 3, the difference in respective areas-in-flow between the two passes is provided by having a greater number of first-pass exhaust plenums 22, 24, 26, 28, 30 than of subsequent-pass plenums 22', 24', 26', 28', 30' (e.g., a ratio of two-to-one in FIG. 3)

From the foregoing, it is apparent that the present invention includes an innovative method for cooling recirculated exhaust. The method includes the steps of conveying coolant through at least one coolant plenum 12, directing heated exhaust through at least one first-pass plenum 22 disposed adjacent to the at least one coolant plenum, defining a first area-in-flow within the first-pass plenum 12, directing heated exhaust through at least one subsequent-pass plenum 22' disposed adjacent to the at least one coolant plenum 12, defining a second area-in-flow within the subsequent-pass plenum 22', with the first area-in-flow substantially exceeding the second area-in-flow, and permitting heat energy to be removed from the exhaust by coolant convection.

By way of generalized, non-limiting summary, it therefore is seen that the function of the EGR cooler is to cool hot exhaust gas using a fluid, preferably liquid, coolant. A two-pass configuration on the gas circuit offers a more compact cooler core 10, but it will be immediately understood that the invention may be adapted to cores having three or more exhaust passes. The folded-flow configuration of FIG. 3 may be preferred, since the divider 40 sits against a bar and to provide better seal against exhaust bypass leakage, without impairing coolant flow. But the concept of the invention is exploited in the embodiments of both FIGS. 2 and 3. In the invention, the first-pass flow of hot gas through the core 10 occurs over a large area, either by routing the inlet flow through more (e.g. equal-diameter) exhaust passages, or simply through a larger overall portion of the core assembly. The result is reduced gas velocity. The lower velocity results in a lower pressure drop across the first pass through the core 10. Since the heat transfer coefficient is a function of velocity, the heat transfer also is reduced. The reduced heat transfer results in a lower core metal surface temperature in the critical first pass, reducing or eliminating damaging coolant boiling in the coolant plenums 12,14,16, 18.

The gas velocity in the second pass through the core 10 is considerably higher than the velocity through the second pass of an "equal area" or "equal number of passages" conventional core design (FIG. 1). Heat transfer thus is increased in the invention There actually is a small net gain in heat transfer for the entire inventive core 10. In the first pass, heat transfer still remains high (but not deleteriously so) due to the large temperature differential between the hot exhaust gas and the coolant. In the second pass, the temperature differential is much smaller, but the increased velocity in the second pass compensates. The increased velocity in the second pass also means that the pressure drop in the second pass is higher than for the "equal pass" design of known coolers. However, because the gas has been cooled by the first pass, the increase is small.

A further benefit of the inventive unequal pass design is reduced fouling. In diesel exhaust, the soot can coat the heat exchanger surfaces, reducing heat transfer. This is particularly true in the second pass through the core, in which the gas is cooler and has slowed, since high gas velocity tends to entrain the particulate and help prevent fouling. The inventive unequal pass design increases gas velocity in the second pass and ameliorates fouling.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A multi-pass heat exchanger core comprising:
   at least one coolant plenum for containing flowing coolant;
   at least one first-pass plenum for containing a flowing heated fluid, said first-pass plenum adjacent to said at least one coolant plenum, and said first-pass plenum defining a first area-in-flow of the heated fluid; and
   at least one subsequent-pass plenum for containing the heated fluid, said subsequent-pass plenum adjacent to said at least one coolant plenum, and said subsequent-pass plenum defining a second area-in-flow of the heated fluid;
   wherein said first area-in-flow substantially exceeds said second area-in-flow, and the heated fluid flows past a coolant plenum at least twice.

2. An apparatus according to claim 1, comprising a plurality of coolant plenums, a plurality of first-pass plenums, and a plurality of subsequent-pass plenums, wherein said first-pass and said subsequent-pass plenums are arranged in an alternating manner between cooling plenums, every second plenum being a cooling plenum.

3. An apparatus according to claim 1, wherein said heated fluid comprises exhaust gases, and further comprising:
   a first plurality of exhaust passages defined in each of said first-pass plenums to direct the exhaust gases though said first-pass plenums; and
   a second plurality of exhaust passages defined in each of said subsequent-pass plenums to direct the exhaust gases though said subsequent-pass plenums;
   wherein the number of exhaust passages in said first-pass plenum substantially exceeds the number of exhaust passages in said subsequent-pass plenum.

4. An apparatus according to claim 3 wherein said first and said second pluralities of exhaust passages have equal radial cross sectional areas.

5. An apparatus according to claim 4 wherein the ratio of exhaust passages defined in said first-pass plenums to the exhaust passages defined in said subsequent-pass plenums is greater than 1:1.

6. An apparatus according to claim 3 wherein said exhaust passages are defined by fins within said first-pass and said subsequent-pass plenums, wherein said fins conduct heat energy toward said cooling plenums.

7. A multi-pass exhaust gas recirculation cooler comprising:
   a plurality of coolant plenums for containing flowing coolant;
   a plurality of first-pass plenums for containing hot exhaust gases, each of said first-pass plenums disposed adjacent to at least one of said coolant plenums;
   a plurality of subsequent-pass plenums for containing the hot exhaust gases, each of said subsequent-pass plenums disposed adjacent to at least one of said coolant plenums;

a plurality of exhaust passages defined in each of said first-pass plenums; and a plurality of exhaust gas passages defined in each said subsequent-pass plenums;

wherein said exhaust gas passages have substantially equal radial cross sectional areas, and wherein further the total number of exhaust passages in said plurality of first-pass plenums substantially exceeds the total number of exhaust passages in said plurality of subsequent-pass plenums, and the exhaust gases flow past a coolant plenum at least twice.

8. An apparatus according to claim 7, further comprising at least one elongate divider to separate the exhaust flow in said first-pass plenums from the exhaust flow in said subsequent-pass plenums, wherein all said plenums are substantially parallel, and further wherein an imaginary plane containing said divider is perpendicular to said plenums to direct the hot exhaust gases in a crossflow.

9. An apparatus according to claim 7, further comprising at least one elongated divider to separate the exhaust flow in said first-pass plenums from the exhaust flow in said subsequent-pass plenums, wherein all said plenums are substantially parallel, and further wherein an imaginary plane containing said divider is parallel to said plenums to direct the hot exhaust gases in a folded flow.

10. A method for cooling recirculated exhaust, the method comprising:

conveying coolant through at least one coolant plenum;

directing heated exhaust through at least one first-pass plenum disposed adjacent to the at least one coolant plenum, defining a first area-in-flow within the first-pass plenum;

re-directing the heated exhaust through at least one subsequent-pass plenum disposed adjacent to the at least one coolant plenum;

defining a second area-in-flow within the subsequent-pass plenum, the first area-in-flow substantially exceeding the second area-in-flow; and permitting heat energy to be removed from the exhaust by coolant convection.

* * * * *